Aug. 8, 1972  T. C. BENNETT  3,682,664
BUN WARMER AND STEAMER AND HOTDOG COOKER
Filed Nov 19, 1970  2 Sheets-Sheet 1

INVENTOR.
TARQUIN C. BENNETT
BY
Woodard, Weikart, Emhardt & Naughton
ATTORNEYS

United States Patent Office 3,682,664
Patented Aug. 8, 1972

3,682,664
BUN WARMER AND STEAMER AND HOTDOG COOKER
Tarquin C. Bennett, 123–125 N. 6th St., Marshall, Ill. 62441
Filed Nov. 19, 1970, Ser. No. 91,075
Int. Cl. A21d 15/00
U.S. Cl. 99—339         2 Claims

ABSTRACT OF THE DISCLOSURE

A device for warming and steaming buns and for cooking hotdogs. A top vessel is pivotally mounted to a bottom vessel and has a perforated bottom wall for allowing steam to seep therethrough. A lid pivotally mounted to the top vessel has a pair of handles. One of the handles may be pulled upwardly to pivot the top vessel with respect to the bottom vessel whereas the other handle may be pulled upward to pivot the lid with respect to the top vessel.

BACKGROUND OF THE INVENTION

Field of the invention

This invention is in the field of containers for cooking and warming food.

Description of the prior art

A number of utensils have been devised for cooking and warming food. Four such devices are shown in the following U.S. patents: 92,867 issued to Mitchell; 1,330,868 issued to Harrison; 2,649,852 issued to McCandless; and 2,737,881 issued to Turner.

The present invention is a new and improved device for warming and steaming buns and for cooking hotdogs. The device has a top vessel pivotally mounted to a bottom vessel and a lid pivotally mounted to the top vessel.

SUMMARY OF THE INVENTION

A device for cooking hotdogs and for warming and steaming buns. A top vessel having opposite first and second ends is pivotally mounted to a bottom vessel. The top vessel has a perforated bottom wall. A first hinge is fastened to the bottom vessel and to the first end of the top vessel. A second hinge is fastened to a lid positioned over the top vessel and to the second end of the top vessel.

It is an object of the present invention to provide a new and improved device for cooking hotdogs and for warming and steaming buns.

It is a further object of the present invention to provide such a device which also has a top vessel pivotally mounted to a bottom vessel and a lid pivotally mounted to the top vessel.

Related objects and advantages of the present invention will be apparent from the following description.

DESCRIPTION OF THE PREFERRED EMBODIMENT

Figure 1:
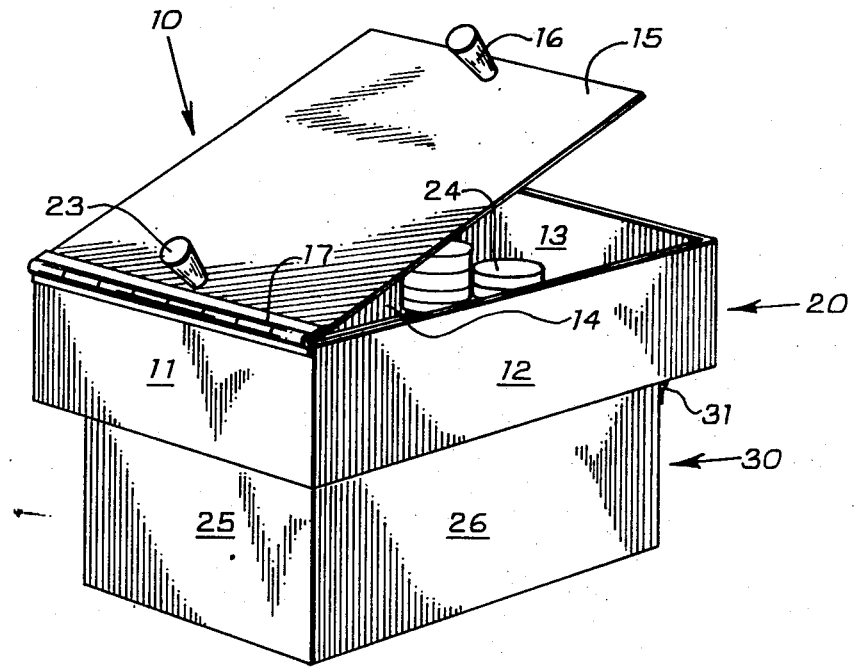
FIG. 1 is a perspective view of a device incorporating the present invention with the top lid shown in the partially open position.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
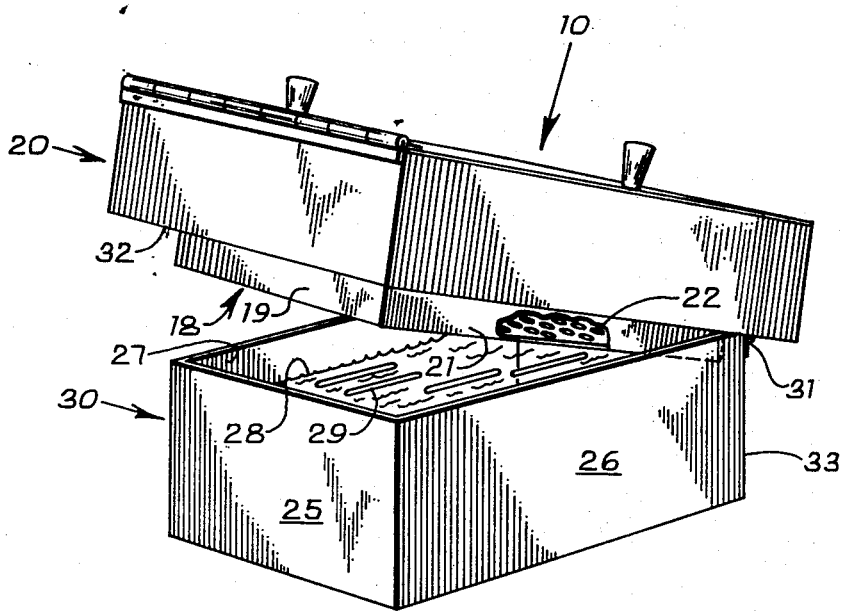
FIG. 2 is the same view as FIG. 1 with the top vessel shown partially open from the bottom vessel.
Figure 3:
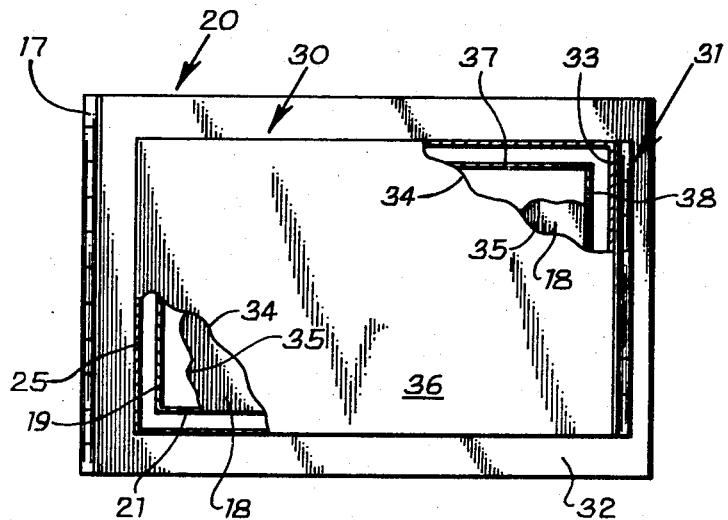
FIG. 3 is a bottom elevation of the device of FIG. 1 with the bottom walls of the top and bottom vessels broken away.

Referring now more particularly to FIGS. 1 through 3, there is shown device 10 having a top vessel 20 for warming and steaming buns being mounted atop a bottom vessel 30 for cooking hotdogs therein. Bottom vessel 30 is a five-sided container having side walls 25, 26, 27 and 33 integrally joined to bottom wall 36. Vessel 30 is of a suitable size to place onto a stove burner for cooking water 28 and hotdogs 29.

Top vessel 20 has four side walls 11, 12, 13 and 14 (FIG. 1) integrally joined to a bottom wall 32 (FIG. 3) which is depressed downward forming four smaller side walls 19, 21, 37 and 38 integrally joined together by a perforated bottom wall 18. A piano hinge 31 has one leaf fastened to wall 33 of bottom vessel 30 and another leaf fastened to wall 32 of top vessel 20. Thus, top vessel 20 may be pivoted upwardly about the top edge of wall 33.

In FIG. 3, the bottom wall 36 of the lower vessel 30 is fragmented at 34 and the bottom wall 18 of the top vessel 20 is fragmented at 35 to illustrate that side walls 19, 21, 37 and 38 are spaced inward of side walls 25–27 and 33 of the lower vessel. Wall 21 is fragmented in FIG. 2 to illustrate the perforations 22 in the bottom wall 18 of the top vessel. In the fully closed position, top vessel 20 seats on top of the lower vessel with bottom wall 18 being positioned within the lower vessel. Steam resulting from the heating of water 28 seeps through perforations 22 and warms and steams buns 24 positioned within the top vessel.

Mounted to the top of vessel 20 is lid 15 having handles 16 and 23 secured thereto. A piano hinge 17 has a first leaf attached to wall 11 and a second leaf attached to lid 15. Thus, handle 16 may be pulled upwardly to pivot the lid 15 for gaining access to vessel 20. Likewise, handle 23 may be pulled upward to pivot vessel 20 about hinge 31 for gaining access to vessel 30.

In one embodiment of the present invention, vessel 30 was 10 in. in length, 6½ in. in width and 4 in. in height, whereas the top vessel was 11½ in. in length, 8 in. in width and 3 in. in height. In the same embodiment, walls 19, 21, 37 and 38 were spaced ¼ in. from walls 25, 26, 27 and 33 of the lower vessel. In addition, bottom wall 18 was positioned 1 in. below the top edge of walls 25, 26, 27 and 33. The holes in the bottom wall 18 were ⅛ in. in diameter.

It will be evident from the above description that the present invention provides a new and improved device for cooking hotdogs and for warming and steaming buns. In addition, it will be evident that the device has a top vessel pivotally mounted to the bottom vessel with a lid pivotally mounted to the top vessel. The bottom vessel is opened by pulling a first handle affixed to the top lid whereas the top container is opened by pulling a second handle affixed to the top lid.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device for cooking hotdogs and for warming and steaming buns comprising:
   a bottom vessel;
   a top vessel having opposite first and second ends and being mounted over and to said bottom vessel, said top vessel having a perforated bottom wall;
   a first hinge fastened to said bottom vessel and to said first end of said top vessel;
   a lid mounted atop said top vessel;
   a second hinge fastened to said lid and to said second end of said top vessel;
   a first handle mounted to said lid being positioned over said first end, said first handle being liftable to pivot said lid about said second end;
   a second handle mounted to said lid being positioned over said second end, said second handle being liftable to pivot said top vessel about said bottom vessel at said first end; and wherein:
   said top vessel has a first and second set of side walls integrally connected together, said bottom vessel has a third set of said walls, said third set is positioned between said first and second set, said first set is positioned outward from said third set.

2. The device of claim 1 wherein: said perforated bottom wall of said top vessel is recessed into said bottom vessel.

References Cited

UNITED STATES PATENTS

| | | | |
|---|---|---|---|
| 150,191 | 4/1874 | Root | 126—369 |
| 300,441 | 6/1884 | Borst | 220—20 |
| 3,489,075 | 1/1970 | O'Reilly | 99—450 |
| 2,766,366 | 10/1956 | Eckhoff | 99—325 |
| 2,397,410 | 3/1946 | Deacon | 99—450 XR |
| 391,085 | 10/1888 | Schneider | 126—369 |
| 448,559 | 3/1891 | Travers | 99—450 |
| 700,968 | 5/1902 | Moore | 99—448 XR |
| 992,119 | 5/1911 | Eccleston | 126—369 |
| 3,155,231 | 11/1964 | Vinas | 220—20 XR |
| 3,320,945 | 5/1967 | Dunkelman | 126—369 |

FOREIGN PATENTS

| | | | |
|---|---|---|---|
| 829,700 | 4/1938 | France | 99—417 |

WALTER A. SCHEEL, Primary Examiner

A. O. HENDERSON, Assistant Examiner

U.S. Cl. X.R.

99—234 R; 126—369